(12) United States Patent
Ward et al.

(10) Patent No.: US 8,171,160 B1
(45) Date of Patent: *May 1, 2012

(54) MULTI-LAYER STACK PLATFORM FOR CLOUD COMMUNICATIONS

(75) Inventors: John Ward, Johnstown, CO (US); Haydar Haba, Burlingame, CA (US)

(73) Assignee: IntelePeer, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/014,919

(22) Filed: Jan. 27, 2011

Related U.S. Application Data

(63) Continuation of application No. 12/909,481, filed on Oct. 21, 2010, now Pat. No. 7,912,983.

(51) Int. Cl.
*G06F 15/173* (2006.01)
*G06F 15/16* (2006.01)
*H04L 12/28* (2006.01)

(52) U.S. Cl. .................. 709/238; 709/227; 370/351

(58) Field of Classification Search .............. 709/227, 709/238; 370/351
See application file for complete search history.

(56) References Cited

U.S. PATENT DOCUMENTS

| | | | |
|---|---|---|---|
| 7,529,230 | B2 | 5/2009 | Lewis et al. |
| 7,627,290 | B2 | 12/2009 | Wing et al. |
| 7,680,112 | B2 | 3/2010 | Demsey et al. |
| 2003/0212821 | A1 | 11/2003 | Gillies et al. |
| 2006/0047742 | A1 | 3/2006 | O'Neill et al. |
| 2006/0265509 | A1 | 11/2006 | Pandit |
| 2007/0036143 | A1 | 2/2007 | Alt et al. |
| 2008/0086564 | A1 | 4/2008 | Putman et al. |
| 2009/0129372 | A1 | 5/2009 | Pandey et al. |
| 2010/0034200 | A1 | 2/2010 | Melampy et al. |
| 2010/0071053 | A1 | 3/2010 | Ansari et al. |
| 2010/0082828 | A1 | 4/2010 | Jennings et al. |

FOREIGN PATENT DOCUMENTS

EP 2048863 4/2009

OTHER PUBLICATIONS

Joseph, Jean-Philippe, "IMS Network Signaling Peering: Challenges and Proposal," *Bell Labs Technical Journal*, 2008, vol. 12, Issue 4, pp. 33-48.

"PointOne Deploying NexTone Session Controllers for Greater Flexibility in VoIP Interconnections; NexTone's FlexControl Capabilities Offer PointOne End-to-End Traffic Management and Control," *Business Wire*, Mar. 29, 2004.

Schwann, Nico et al., "Peer-to-Peer VoIP MMoIP for Public Services—Requirements and Architecture," *ICIN*, 2007.

*Primary Examiner* — Ranodhi Serrao
(74) *Attorney, Agent, or Firm* — DLA Piper LLP (US)

(57) ABSTRACT

A multi-layer stack platform is provided for cloud communication connections and services between devices. The system includes three or more layers, including a directory component, an applications component, and a peering component. An interconnection component may also be provided for communication between the applications component and the peering component. The components operate to provide communication services, such as sessions, according to the functionality of a selected application by adhering to device, user, and routing rules and preferences. The device, user, and routing rules and preferences are maintained in and processed by the directory component. The applications component receives communication session requests and accesses corresponding application scripts to perform the requested session. The peering component receives the device, user, and routing rules and preferences, and establishes connection between devices based on the rules and preferences as defined by the directory component.

10 Claims, 7 Drawing Sheets

MULTI-LAYER STACK PLATFORM FOR CLOUD COMMUNICATIONS

RELATED APPLICATION

This application is a continuation of U.S. application Ser. No. 12/909,481, entitled "Multi-Layer Stack Platform for Cloud Communications," filed on Oct. 21, 2010, the content of which is incorporated herein in its entirety.

TECHNICAL FIELD

This disclosure relates generally to cloud communication connections. More particularly, the disclosure relates to a multi-layer stack platform that implements cloud communication connections between various devices and/or networks.

BACKGROUND

A communications carrier or service provider offers communications access, such as voice, video, and data communications, to customers. A customer purchases service from the communications carrier or communications service provider to gain communications network access for one or more communication devices owned or operated by the customer. The communication devices can include any device capable of transmitting or receiving voice, video, and/or data, including but not limited to: telephones, smart phones, mobile phones, personal digital assistants (PDAs), computers, FAX machines, Internet-enable devices, media players, set-top boxes, email devices, video phones, etc.

During the process of establishing cloud communication connections between devices, multiple network components are typically utilized. Such network components may include various forms of communication networks and equipment, including but not limited to: switches, routers, hubs, repeaters, bridges, servers, etc. These network components are disparate elements, and as such, communication and message transmission between components is not streamlined and may be inefficient.

Accordingly, there is a need and desire for an improved platform for establishing communication services, such as communication sessions, between devices.

SUMMARY

A system for providing cloud communication connections between devices connected to one another through one or more networks includes, according to an embodiment, a directory component, an applications component, and a peering component. The directory component stores information, including user information and routing information, in data sources. The directory component further determines a routing policy for a communication session between an origination user and a destination user based upon the user and routing information. The determination of a routing policy includes selecting a destination device, and the routing policy includes information related to an origination device, the selected destination device, and a route therebetween. The applications component is configured to receive a communication session request from an origination device for a communication session with the destination user. The applications component is further configured to create a communication message that includes information related to the requested communication session by accessing application scripts and selecting an application script. The peering component is responsible for establishing a connection between the devices to provide for the communication session to be conducted. The peering component is configured to receive the communication message and the routing policy, and to perform the communication session by connecting the origination device and the selected destination device. The connection adheres to the routing policy and the selected application script.

A method for providing communication connections between devices includes maintaining user information and routing information at a directory component. The method further includes receiving a request to perform a communication session between an origination device and a destination user, where the request is received at an applications component by a user accessing an application via the origination device. The applications component identifies the requested communication session to be executed, and creates, by accessing application scripts, a communication message with information related to the requested communication session. The directory component determines a routing policy for the communication session based upon user and routing information, including selecting a destination device. The communication message, as well as the routing policy, are transmitted to a peering component. The peering component performs the communication session by connecting the origination device and the selected destination device, and adhering to the routing policy and a selected application script.

BRIEF DESCRIPTION OF THE DRAWINGS

The foregoing summary and the following detailed description are better understood when read in conjunction with the appended drawings. Exemplary embodiments are shown in the drawings, however, it is understood that the embodiments are not limited to the specific methods and instrumentalities depicted herein. In the drawings.

DETAILED DESCRIPTION

Figure 1:
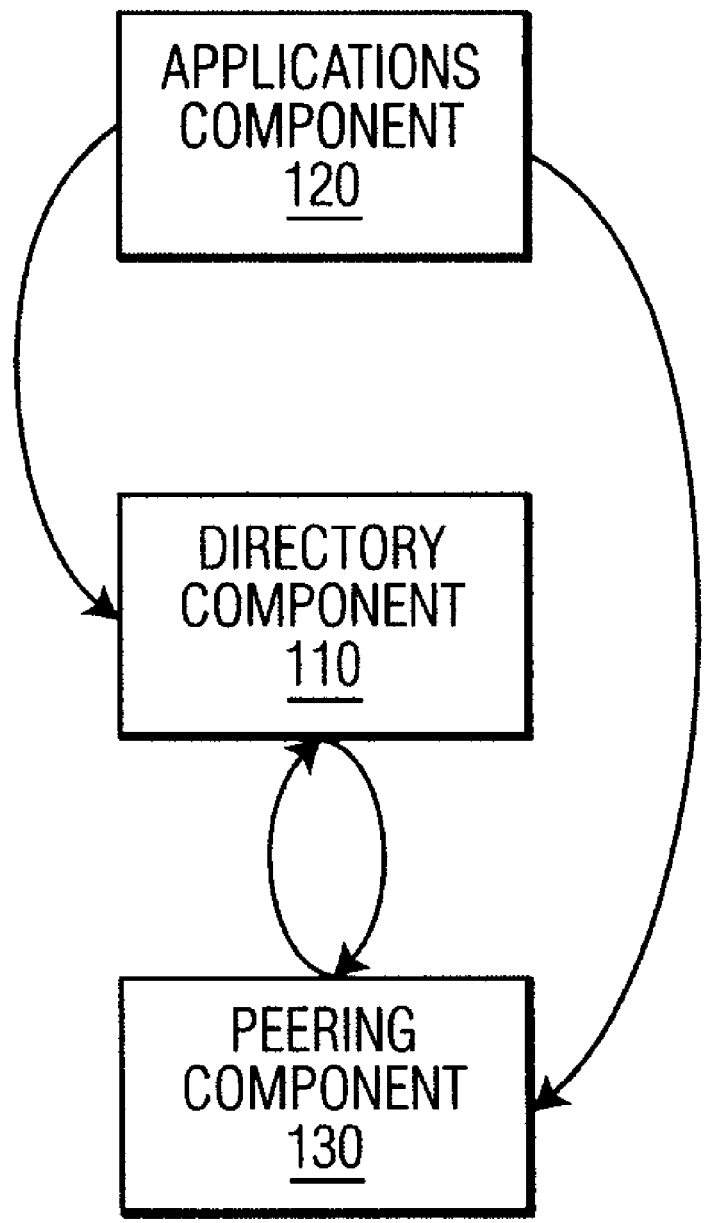
FIG. 1 illustrates a block diagram of a system for providing communication connections, according to an embodiment.

With reference to FIG. 1, a block diagram illustrates an exemplary system for providing cloud communication connections and services between devices connected to one another through one or more networks, according to an embodiment. The system may include one or more layers, and in FIG. 1 is illustrated an embodiment comprising three layers: a directory layer (or directory component 110), an applications layer (or applications component 120), and a peering layer (or peering component 130). The three components 110, 120, and 130, described in greater detail below, may communicate with one another through application programming interfaces (APIs) and session initiation protocol (SIP)

messaging, for example, as described in greater detail below. Together, the three components operate to provide cloud communication services, such as communication sessions, according to the functionality of a selected application by adhering to device, user, and routing rules and preferences.

The directory component 110 is generally responsible for managing and maintaining information relating to end points (i.e., devices), networks, and routing policies. The directory component 110 is a policy-based routing engine that stores and maintains directory (or registry) entries that include user information, as well as routing information, and that utilizes both the user and routing information to determine a routing policy for a communication session.

A directory entry may be associated with a corresponding device and may include one or more of a device identifier, user preferences, and routing attributes. Alternatively, a directory entry may be associated with a particular user who has a plurality of devices; thus the directory entry for the particular user may include information for the plurality of devices, such as a device identifier and user preferences for each device of the corresponding user.

Routing information may include, for example, one or more of routing options that are based on quality level established for a device, cost constraints established for a device, time constraints established for a device, and registration of the device for direct call connection. User information may include user preferences such as, for example, identification of undesirable traffic types, time and date settings, and/or availability of devices.

The directory entries, including user information, may be provided by users and/or various providers. For example, a user may create a directory entry through a browser or other suitable interface. A user may input or otherwise provide information relating to their preferences for particular communication sessions, such as how to communicate with a particular device at a particular time of day. Various parts of the user information may be automatically obtained by the directory component 110 when a particular device is registered with a service provider. For example, a service provider may automatically provide the device identifier of a user's device for incorporation in a corresponding directory entry.

Figure 2:
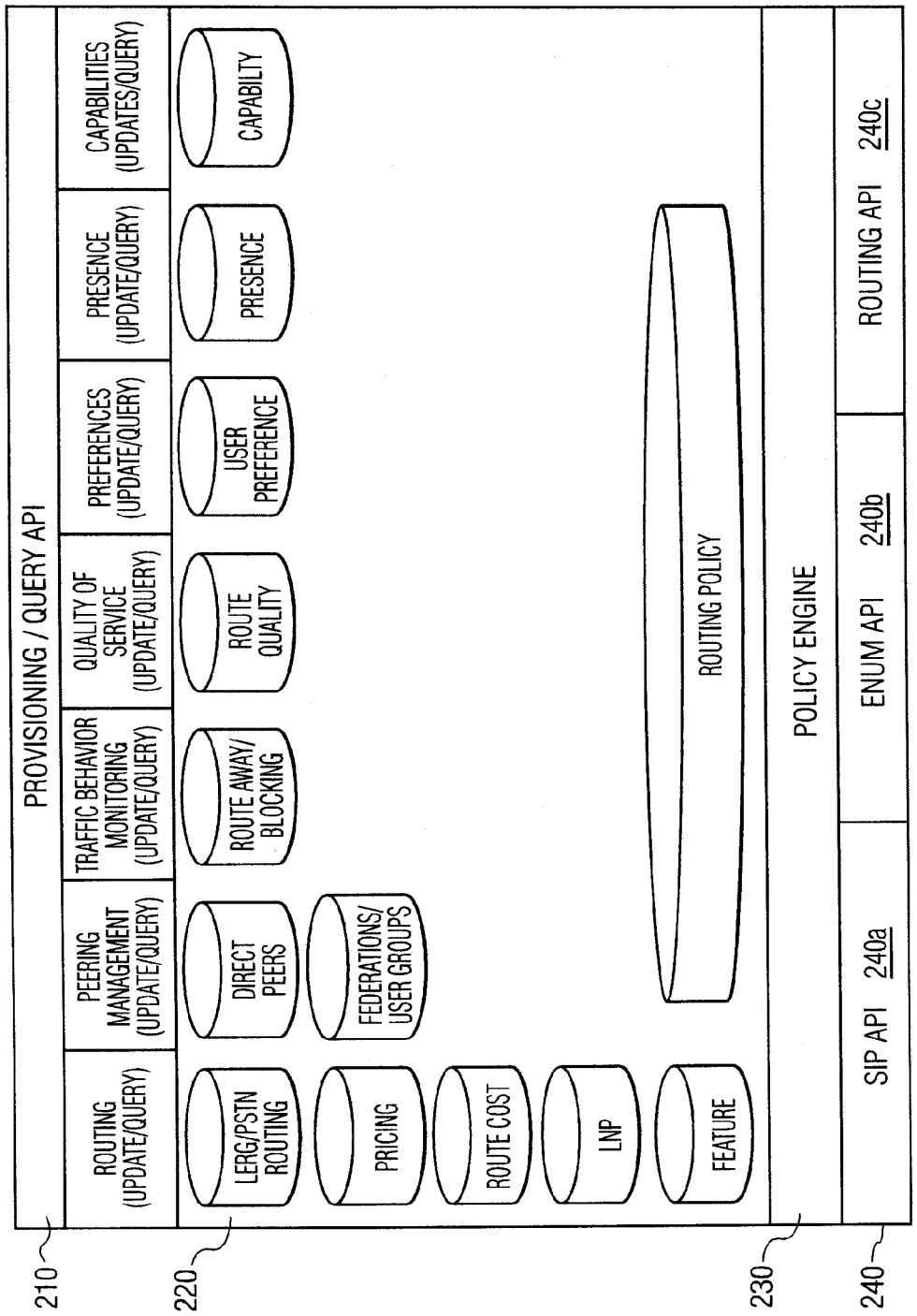
FIG. 2 illustrates a block diagram of a directory component, according to an embodiment.

With reference to FIG. 2, the directory component 110, according to an embodiment, is illustrated. The directory component 110 includes a first application program interface (API) 210 for communicating with devices and network components relating to various user records or specifications (i.e., the user directory entries). The directory component 110 includes a data portion 220 including various data sources in which information relating to user preferences, user groups, user registrations to various services, and the like are stored. The data portion 220 also includes various data sources containing the routing information.

For example, as shown in FIG. 2, the data portion 220 of the directory component 110 includes routing data sources containing routing information, such as routing, peering management, traffic behaviour and monitoring, and quality of service. Examples of the data sources include: a "LERG/PSTN" (local exchange routing guide/public switched telephone network) data source that indicates optimal routing preferences for devices that communicate via the PSTN; a "pricing" data source that indicates pricing considerations for the devices; a "route cost" data source that includes information related to the cost for utilizing various routes between devices; a "LNP" (local number portability) data source refers to information that defines a current ported status of an E.164 number; a "feature" data source indicates communication routing to occur based on best match features between devices; a "direct peers" data source indicates if a particular user device is registered for direct call connection or similar services; a "federations/user groups" data source defines groups of parties or federations for certain types of communications; a "route way/blocking" data source includes information relating to undesirable communication types and numbers; and "route quality" data source allows for the specifying of a desired quality level for communications.

With further reference to FIG. 2, the data portion 220 of the directory component 110 includes user data sources containing user information, such as preferences, presence, and capability. Examples of the user data sources include: a "user preferences" data source that indicates user criteria such as time of day, day of week, and call screening, for example; a "presence" data source may define a preference of whether a call or communication session may occur based on the endpoint being available; and a "capability" data source; and a "capability" data source may define the various capabilities of a particular device, such as voice, text message, and video capabilities.

Fewer or more data sources may be included in the data portion 220. Furthermore, a directory entry for a particular device need not indicate a record for each category. Moreover, information in the data portion 220 may include information for a plurality of user devices for a particular user.

The routing information and user information contained in the various data sources 220 may thus define one or more routes between devices, resulting in a routing policy for a particular communication session. The one or more routes may be ranked, and the ranking may be based on various criteria, such as one or more of transmission cost, transmission time, and/or quality, as examples. According to an embodiment, a route that is utilized for a communication session between devices may be the highest ranked route that is available. According to an additional embodiment, the utilized route may be the route that first completes a connection between the devices. Thus, according to this embodiment, connection over several routes may be attempted until a connection is secured. The other attempted connections may then be dropped.

The directory component 110 thus provides the functionality for establishing a routing policy, including the selection of a destination device out of a plurality of destination devices. The directory component 110 includes a policy engine 230, which is a processor that obtains the relevant routing and user information and determines the routing policy.

As an example, a user of an origination device may desire communication with a particular end user, in which the type of communication (i.e., voice, text, video) and the destination device is not a concern to the origination user. The policy engine 230 utilizes the routing information and the user information contained in the data sources 220 to determine the most suitable destination device and route for the communication with the user of the origination device. The determination of the destination device provides for the desired communication to be established with a destination user while various details, such as the device and route, remain anonymous to the origination user.

The directory component 110 also includes various APIs 240 for providing internal and external networks and components, such as the peering component 130, with the routing policy as established by the policy engine 230. The APIs may include a SIP API 240*a*, an ENUM (e.g., telephone number mapping) API 240*b*, and a routing API 240*c*, for example.

Figure 3:
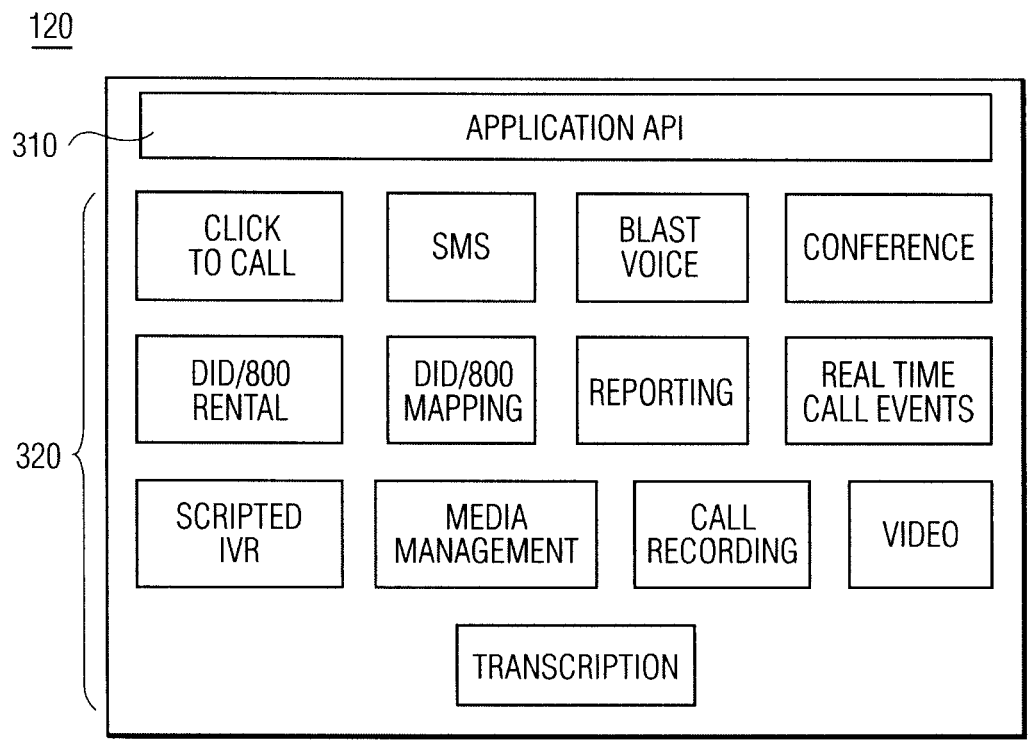
FIG. 3 illustrates a block diagram of an applications component, according to an embodiment.

Now with reference to FIG. 3, the applications component 120 is illustrated. The applications component 120 is generally responsible for recognizing and initiating various application requests. When an application is accessed by a user via a user device to perform a corresponding communication session, the applications component 120 receives and identifies a communication session request. The applications component 120 is further configured to create a communication message including information related to the requested communication session.

With reference to FIG. 3, the applications component 120 includes an API 310 for communicating with various devices and network components. The applications component 120 also includes a plurality of application scripts 320. Alternatively or additionally, a remote script server (not shown) may include one or more application scripts for access by the applications component 120. An application script is a set of instructions which, when executed, cause specific actions to occur, such as establishing a communication session between two or more devices according to information contained in the script. The applications component 120 creates the communication message related to a requested communication session by accessing one or more application scripts 320 and selecting an application script for the communication session.

Examples of applications, as defined by corresponding application scripts 320, include but are not limited to: click to call, which provides a voice connection between endpoints; short message service (SMS) messaging, which provides messaging capabilities between endpoints; blast SMS, which provides a mass delivery of outbound messages; blast voice, which delivers media to one or more endpoints; auto conference, for scheduling automatic dialing for conference call bridging; dialed number translation, for mapping local numbers to termination points; number rental, which allows for numbers to be rented; reporting, for usage and performance reporting for API generated calls; real time call events, for allowing call progress to be reported to various applications; recording, which delivers recordings; scripted interactive voice response (IVR), which allows users to define IVRs to be applied to voice calls; transcription, for allowing conversations to be transcribed and delivered; media management, which allows media to be converted and included in call sessions; and video messaging, which allows for video sessions to be established and conducted.

Figure 4:
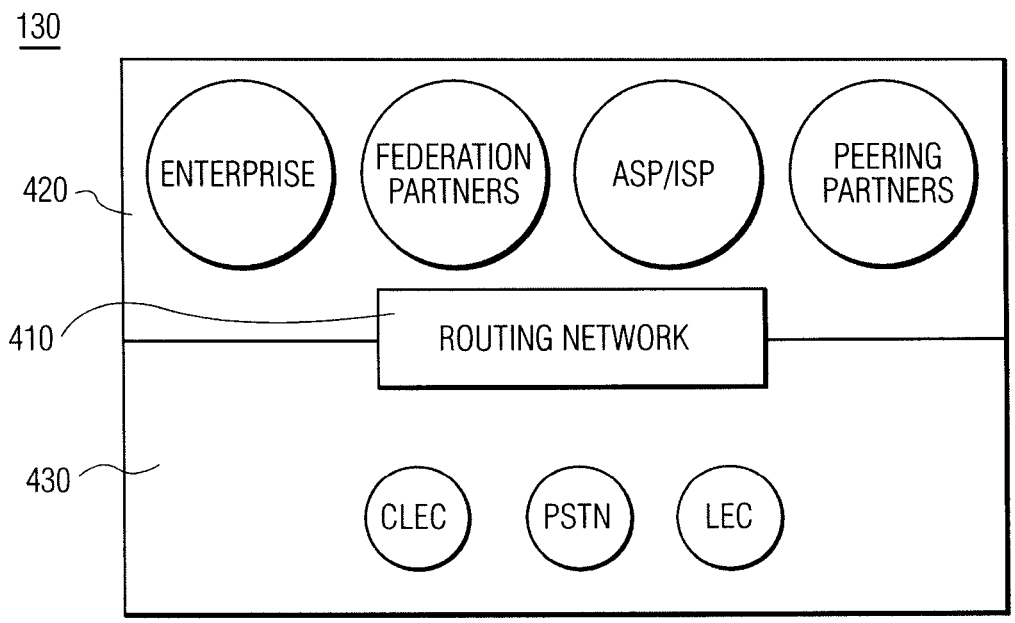
FIG. 4 illustrates a block diagram of a peering component, according to an embodiment.

With reference to FIG. 4, the peering component 130, according to an embodiment, is illustrated. The peering component 130 is generally responsible for managing the physical connections and capabilities between networks, thereby providing the actual connections between devices or endpoints. The peering component 130 performs the connection between devices by adhering to the routing policy determined by the policy engine 230 based upon the routing and user information. The peering component 130 is configured to receive the communication message identifying the requested communication session, as well as the routing policy, and perform the communication session by connecting the origination and destination devices while adhering to the routing policy and application script.

The peering component includes a routing network 410 that routes the communication sessions to connect two or more devices. In routing the communication sessions, the peering component 130 utilizes the user and routing information as described above with respect to the directory component 110. That is, for example, the peering component 130 may connect a communication session over a route that is defined as the preferred or optimal route, or may drop a call if the call type is defined as undesirable, or may route the session to a secondary device at a certain time of day (i.e., adhering to the routing policy).

The peering component 130 may utilize various types of carriers or providers 420, such as enterprise, federation partners, application service provider/internet service provider (ASP/ISP), and peering partners, as well as networks and exchange carriers 430, such as competitive local exchange carriers (CLECs), local exchange carriers (LECs), and PSTN. Thus, according to an embodiment, the peering component 130 is configured to connect to multiple networks and exchange carriers for establishing the communication session and connecting the devices. Moreover, the peering component 130 may connect directly to various destination devices or to a service provider of the destination device for routing communications to the destination device.

Additionally, the peering component 130 supports various technologies and call types, such as but not limited to voice, video, instant messaging, and SMS messaging. The peering component 130 may perform signaling protocol conversion. Endpoints or devices may employ different signaling protocols that are conducive to the applications and operation of the device. If a call or communication session is being transmitted between two devices, it may be necessary to transcode, or convert, the call to a format that is compatible with the destination device. Thus, the peering component 130 may determine the signaling protocol of each endpoint, and convert the call to a format compatible with the signaling protocol of the destination endpoint if its signaling protocol differs from that of the origination endpoint. Examples of signaling protocols may include, but are not limited to, IP, time-division multiplexing (TDM), and SS7.

Figure 5:
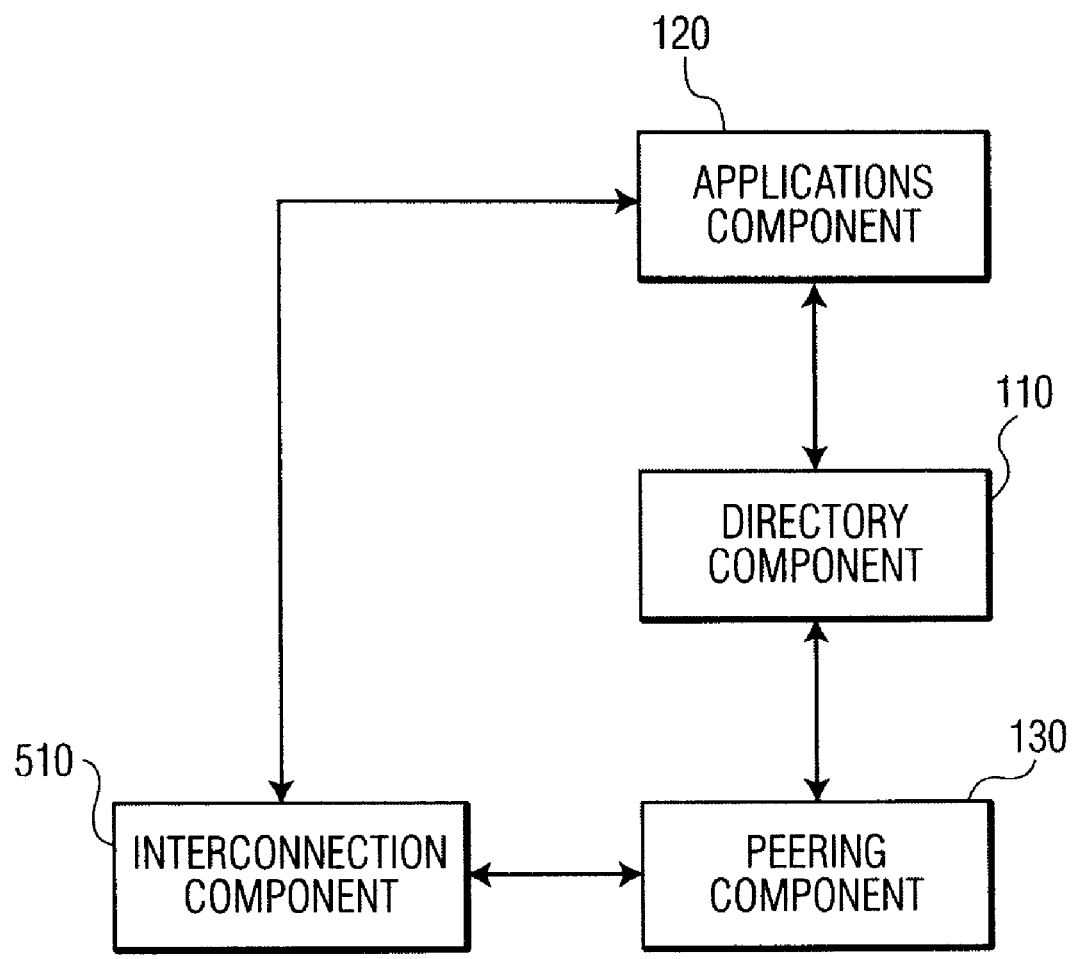
FIG. 5 illustrates a block diagram of a system for providing cloud communication connections, according to another embodiment.

According to an additional embodiment, as illustrated in the block diagram provided in FIG. 5, a system for providing cloud communication connections between devices includes an additional layer, or component, interconnection component 510. The interconnection component 510 may act as an intermediary between the applications component 120 and the peering component 130. For example, the applications component 120 may transmit the generated communication message based upon the requested communication session to the interconnection component 510 for subsequent transmission to the peering component 130. Additionally, if the applications component 120 obtains the routing policy from the directory component 110, this information may also be provided to the interconnection component 510 for subsequent transmission to the peering component 130. The interconnection component 510 includes an API for handling such communications and transmissions. The interconnection component 510, although shown in FIG. 5 as a separate, remote component, may according to additional embodiments be integrated with one or more other components, such as the peering component 130 or the directory component 110.

The components 110, 120, 130, and 510 may each include, according to various embodiments, a processing element embodied as a processor, a co-processor, a controller, or various other processing means or devices including integrated circuits. The components 110, 120, 130, and 510 may include communication interface elements for communication with other devices and components. The communication interface elements may be a device or means embodied in hardware, software, or a combination that is configured to receive and transmit data between the components 110, 120, 130, and 510 and other devices and components in multiple networks. Each components 110, 120, 130, and 510 may also include one or more memory elements, including volatile or non-volatile memory, for storing information, instructions, or the like to enable the corresponding components 110, 120, 130, and 510 to perform various functions. Alternatively or additionally, the components 110, 120, 130, and 510 may communicate with remote memory elements stored on a server or the like.

Figure 6:
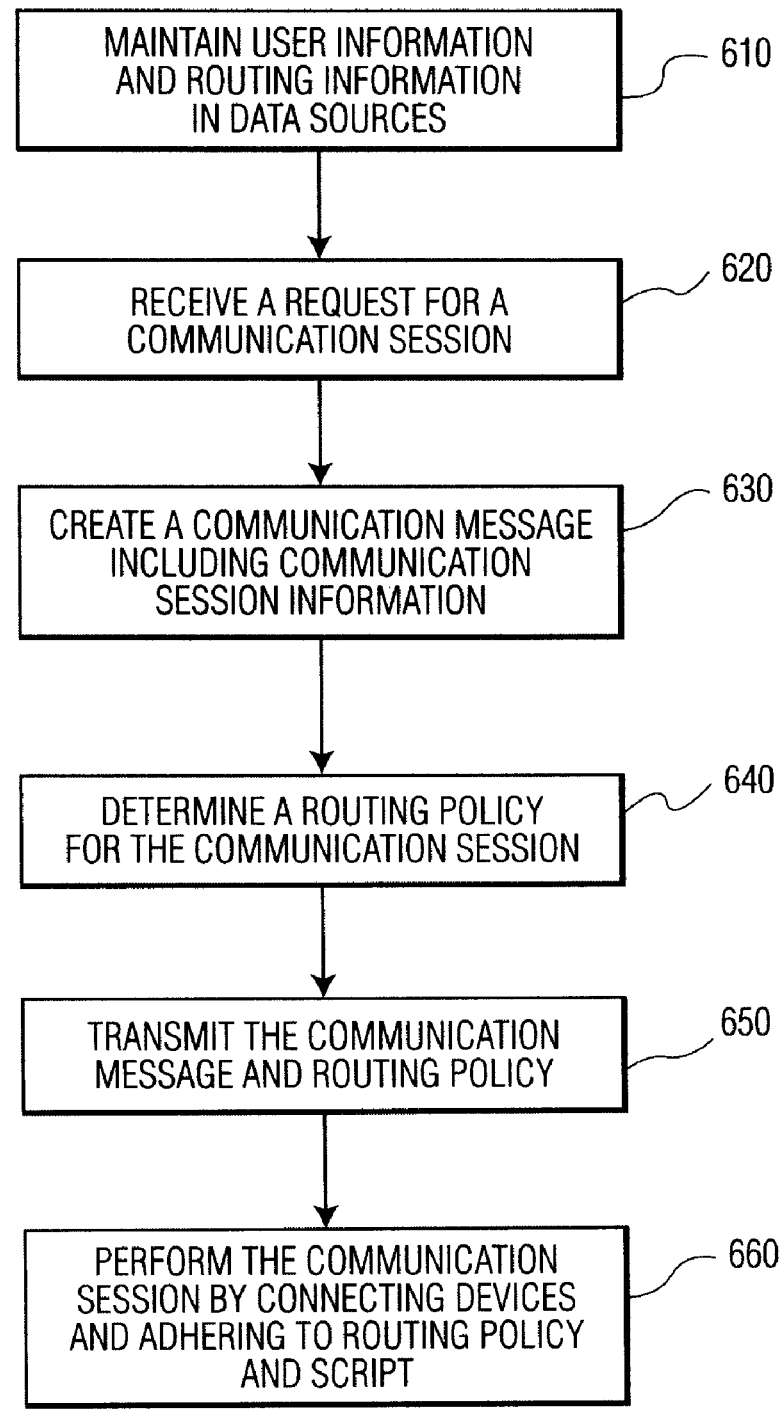
FIG. 6 illustrates a flow chart of a method for providing cloud communication connections, according to an embodiment.

With reference to FIG. 6, a flow chart of a method for providing cloud communication connections, according to an embodiment, is illustrated.

At 610, information in data sources is maintained by the directory component 110. The information includes user information and routing information, and the information related to a particular user comprises a directory entry.

At 620, a request for a communication session is received by the applications component 120. The communication session request is generated by a user's device when an application is accessed by an origination user via the user device to perform a corresponding communication session.

At 630, the applications component 120 creates a communication message that includes information related to the requested communication session. The communication message is created by accessing one or more relevant application scripts 320, stored in the applications component 120 or at a remote server, and by selecting an application script for the communication session. The application scripts 320 define the functionality of the requested communication session, such as a text message or conference call, for example.

At 640, a routing policy for the communication session between the origination user and a destination user based upon user information and routing information related to the users is determined. The determination includes selecting a destination device. The routing policy includes information related to the origination device, the selected destination device, and a route therebetween.

At 650, the communication message, and the routing policy are transmitted to the peering component 130 via an application programming interface, such as an API 240. The applications component 120 may obtain the associated routing policy, which may be provided directly to the peering component 130 or through the interconnection component 510. Similarly, the applications component 120 may provide the communication message to the interconnection component 510 for transmission to the peering component 130, or may directly provide the communication message to the peering component 130. The peering component 130 may query the directory component 110 through, for example, a SIP message, to obtain the routing policy for the communication session.

At 660, the peering component 130 performs the requested communication session by connecting the origination and destination devices and adhering to the determined routing policy and the selected application script.

Figure 7A:
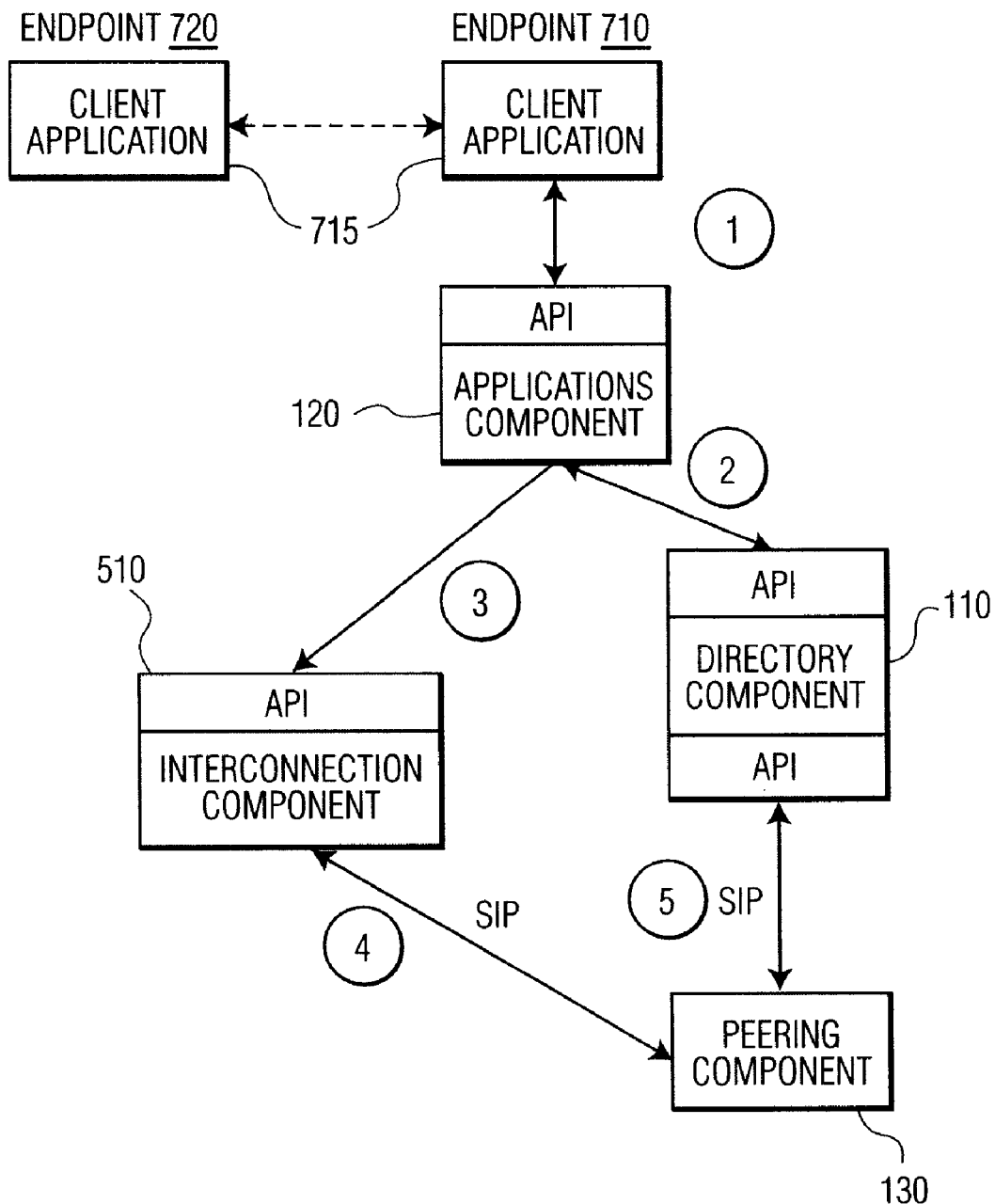
FIGS. 7a and 7b illustrate example implementations of a system that provides cloud communication connections, according to various embodiments.
Figure 7B:
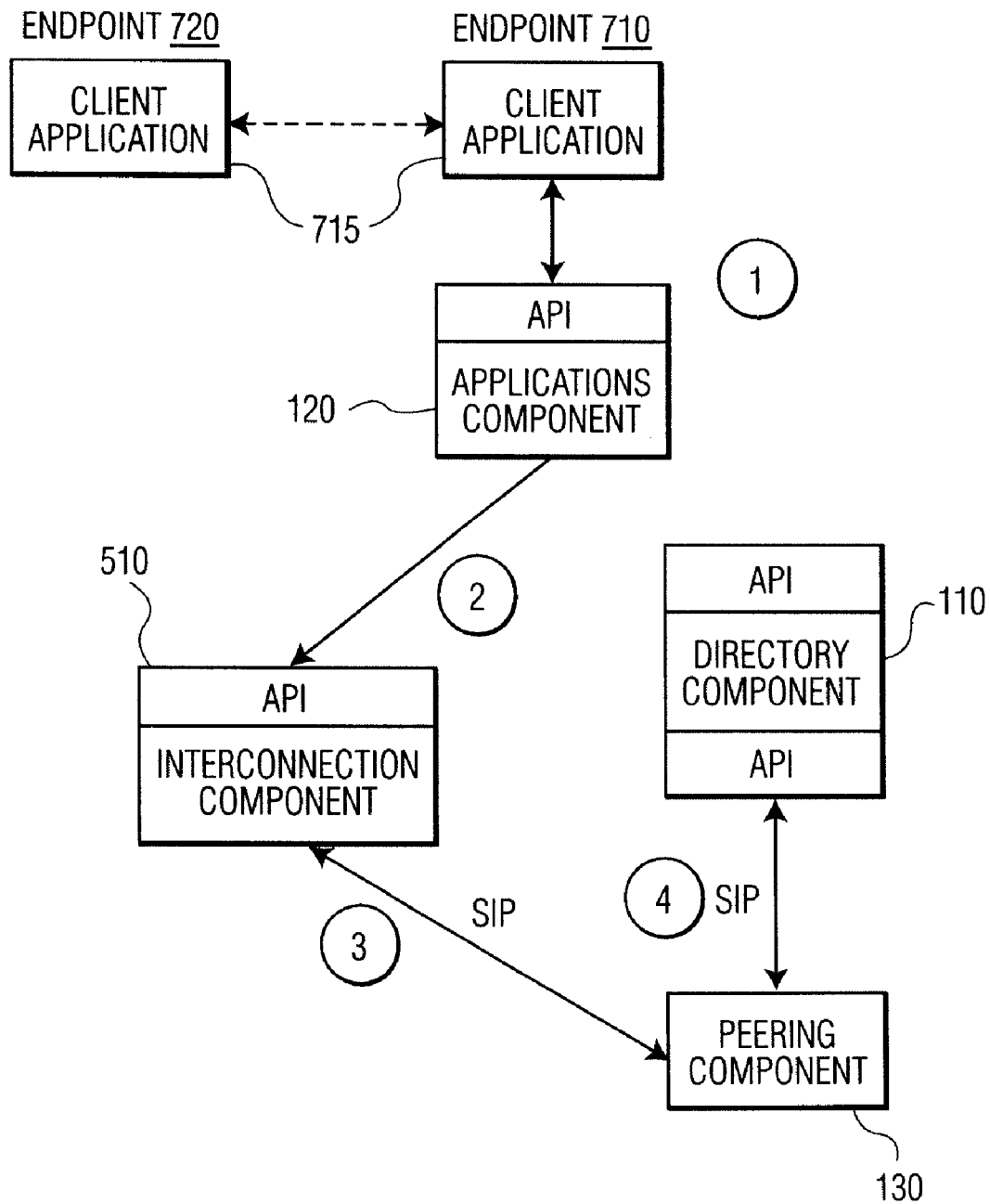

FIGS. 7a and 7b provide example implementations of a system, such as the system illustrated in FIG. 5, according to various embodiments. Although the interconnection component 510, as described above with respect to FIG. 5, is utilized in the example implementations, the interconnection component 510 may not be required or utilized.

With reference to FIG. 7a, endpoints 710 and 720 are illustrated with the exemplary system. The endpoints 710 and 720 may be one or more of a variety of communication devices, such as, for example and without limitation, a standard telephone, a cellular phone or other wireless device, a computer, a PDA, a voice over Internet protocol (VoIP) phone, a soft phone, a video phone, or the like. Thus one endpoint 710 or 720 may include various devices, each associated with a particular user.

A client application 715 resides on the endpoints 710 and 720, allowing user's of the endpoints 710 and 720 to initiate and participle in communication sessions with other endpoints. The client application 715 may present a user interface to the user on the user endpoint 710, 720 allowing the user to request and participate in communication sessions. For example, the user interface may include a virtual dial-pad for dialing a telephone number. The user interface may be a browser window or other application window, for example.

In operation, the client application 715 may use an API or framework to initiate and participate in communication sessions as requested by the user through, for example, the user interface (Step 1). The communication request is received by the applications component 120. The applications component 120 analyzes the communication request to identify the requested communication session to be executed.

The applications component 120 transmits a request to the directory component 110 to obtain a routing policy associated with the requested communication session for endpoints 710 and 720; and the requested routing policy is determined by and provided from the directory component 110 to the applications component 120 (Step 2).

The applications component 120 accesses one or more scripts 320 and selects a script 320 to perform the requested communication session. The selection of the script may be based on the routing policy. For example, a video script may be selected if the routing policy indicates that a video communication session will occur between the devices.

Call information, including the one or more scripts 320 and the routing policy, is transmitted to the interconnection component 510 (Step 3). The interconnection component 510, upon receipt of the call information, transmits via an SIP message the call information to the peering component 130 (Step 4).

The peering component 130 transmits to the directory component 110 a request for routing information (i.e., the routing policy) to be utilized between the endpoints 710 and 720 (Step 5). With this information, the peering component 130, as described above, establishes and manages the call connection between the endpoints 710 and 720 over a network, such as the Internet, by contacting endpoints 710 and 720, bridging calls, implementing any necessary protocol conversions, and managing exchanges between the endpoints 710 and 720.

With reference to FIG. 7b, a second example implementation of a system, such as the system of FIG. 5, is illustrated. The process begins with the client application 715 utilizing an API or framework to initiate and participate in a requested communication session, as requested by the user of endpoint 710, for example (Step 1).

The applications component 120 accesses one or more scripts from the script server 310 to perform the requested communication session. Call information, including the one or more scripts, is transmitted to the interconnection component 510 (Step 2). The interconnection component 510, upon receipt of the call information, transmits via an SIP message the call information to the peering component 130 (Step 3).

The peering component 130 transmits to the directory component 110 a request for the routing policy (Step 4). With this information, the peering component 130 establishes and manages the call connection between the endpoints 710 and 720 over a network.

As can be seen from the two example implementations provided in FIGS. 7a and 7b, the peering component 130 may directly obtain the routing policy from the directory component 110 (the implementation shown in FIG. 7b), rather than the extra step of the applications component 120 obtaining the routing policy and including it in the call information message to the interconnection component 510 (the implementation shown in FIG. 7a).

The foregoing examples are provided merely for the purpose of explanation and are in no way to be construed as limiting. While reference to various embodiments are shown, the words used herein are words of description and illustration, rather than words of limitation. Further, although reference to particular means, materials, and embodiments are shown, there is no limitation to the particulars disclosed herein. Rather, the embodiments extend to all functionally equivalent structures, methods, and uses, such as are within the scope of the appended claims.

The invention claimed is:

1. A system for providing communication connections between devices connected to one another through one or more networks, the system comprising:
   a directory component configured for (i) storing information in data sources, the information including user information and routing information, wherein information related to a particular user comprises a directory entry; and (ii) determining a routing policy for a communication session between an origination user and a destination user based upon user information and routing information related to the users, wherein determining a routing policy includes selecting a destination device, wherein the routing policy includes information related to an origination device, the selected destination device, and a route therebetween;
   an applications component configured for (i) receiving a communication session request from the origination device for a communication session with the destination user; and (ii) creating a communication message including information related to the requested communication session by accessing application scripts and selecting an application script for the communication session;
   a peering component configured for (i) receiving the communication message and the determined routing policy; and (ii) performing the communication session by connecting the origination device and the selected destination device, wherein the connection adheres to the routing policy and the selected application script, wherein the peering component is further configured to convert communication between the devices to a signaling protocol compatible with the selected destination device if the signaling protocol of the origination device differs from that of the selected destination device; and
   an interconnection component configured to receive one or more of the communication message and the routing policy, and transfer the received information to the peering component;
   wherein each of the directory component, the applications component, the peering component, and the interconnection component comprise a respective memory device configured to store respective instructions and a respective processing device configured to execute the respective instructions.

2. The system of claim 1, wherein the user information and the routing information related to the users defines one or more routes between the devices, and wherein the one or more routes are ranked.

3. The system of claim 2, wherein the route utilized for the connection comprises (i) the highest ranked route that is available or (ii) the route that first completes the connection between the devices.

4. The system of claim 2, wherein the ranking of the one or more routes is determined based on one or more of transmission cost, transmission time, and quality.

5. The system of claim 1, wherein the interconnection component is integrated with the peering component, integrated with the directory component, or a remote component.

6. The system of claim 1, wherein the routing information comprises routing options based on (i) quality level established for destination devices, (ii) cost constraints established for destination devices, (iii) time constraints established for destination devices, (iv) registration of destination devices for direct call connection, or (iv) a combination thereof.

7. The system of claim 1, wherein the user information comprise (i) identification of traffic types, (ii) time and date settings, (iii) availability of destination devices, or (iv) a combination thereof.

8. The system of claim 1, wherein the peering component is configured to connect to multiple networks and exchange carriers for connecting the devices.

9. The system of claim 1, wherein the peering component is configured to connect directly to the selected destination device or to a service provider of the selected destination device for routing communication to the selected destination device.

10. A method for providing communication connections between devices connected to one another through one or more networks, the method comprising:
   maintaining information in data sources, the information including user information and routing information, wherein information related to a particular user comprises a directory entry;
   receiving a request to perform a communication session between an origination device and a destination user, wherein the request is received at an applications component by an origination user accessing an application via the origination device;
   creating by the applications component a communication message including information related to the requested communication session by accessing application scripts and selecting an application script for the communication session;
   determining by a directory component a routing policy for the communication session between the origination user and the destination user based upon user information and routing information related to the users, wherein determining a routing policy includes selecting a destination device, wherein the routing policy includes information related to the origination device, the selected destination device, and a route therebetween;
   transmitting the communication message and the routing policy to a peering component via an application programming interface;
   performing the communication session by the peering component connecting the origination device and the selected destination device, wherein the connection adheres to the routing policy and the selected application script;
   converting communication between the devices by the peering component to a signaling protocol compatible with the selected destination device if the signaling protocol of the origination device differs from that of the selected destination device; and
   receiving one or more of the communication message and the routing policy by an interconnection component, and transferring the received information to the peering component.

* * * * *